(12) United States Patent
Lin

(10) Patent No.: US 11,872,725 B2
(45) Date of Patent: Jan. 16, 2024

(54) DISPATCH SYSTEM AND DISPATCH METHOD FOR MANUFACTURING MOLD

(71) Applicant: CHUNG CHWAN ENTERPRISE CO., LTD., Taoyuan (TW)

(72) Inventor: Yu-Pau Lin, Taoyuan (TW)

(73) Assignee: Zhong Chuan Technology Limited, Taoyuan (TW)

(*) Notice: Subject to any disclaimer, the term of this patent is extended or adjusted under 35 U.S.C. 154(b) by 1062 days.

(21) Appl. No.: 16/720,009

(22) Filed: Dec. 19, 2019

(65) Prior Publication Data

US 2021/0060823 A1  Mar. 4, 2021

(30) Foreign Application Priority Data

Aug. 27, 2019  (TW) ................... 108130636

(51) Int. Cl.
*B29C 31/00* (2006.01)
*B08B 3/12* (2006.01)
(Continued)

(52) U.S. Cl.
CPC ............... *B29C 31/00* (2013.01); *B08B 3/12* (2013.01); *B21D 53/50* (2013.01); *B23Q 3/155* (2013.01);
(Continued)

(58) Field of Classification Search
CPC ..... B23D 35/008; B29C 31/00; B29C 31/006; B29C 33/3842; B08B 3/12; B23Q 3/155; B23Q 7/046
(Continued)

(56) References Cited

U.S. PATENT DOCUMENTS 4,587,716 A * 5/1986 Bytow ..................... B25J 9/041
83/563
5,840,149 A * 11/1998 Tokunaga ............. B29C 51/428
156/322
(Continued)

FOREIGN PATENT DOCUMENTS

CN  102269982 A  12/2011
CN  104408554 A  3/2015
(Continued)

*Primary Examiner* — Phong H Nguyen
(74) *Attorney, Agent, or Firm* — Li & Cai Intellectual Property Office

(57) ABSTRACT

A dispatch system and a dispatch method for manufacturing mold are provided. The dispatch system includes a control unit, a mold material storage unit, a processing cutter storage unit, an object pick-and-place and transfer unit, a mold processing unit and a mold product storage unit. The mold material storage unit includes many unprocessed mold materials. The processing cutter storage unit includes many processing cutters. The object pick-and-place and transfer unit is electrically connected to the control unit and disposed between the mold material storage unit and the processing cutter storage unit. One of the unprocessed mold materials and one of the processing cutters are transferred to the mold processing unit by the object pick-and-place and transfer unit, the unprocessed mold material is processed to form a mold product by the mold processing unit, and the mold product is transferred to the mold product storage unit.

8 Claims, 9 Drawing Sheets

(51) Int. Cl.

| | | |
|---|---|---|
| *B29C 71/00* | (2006.01) | |
| *B65G 47/90* | (2006.01) | |
| *B23Q 3/155* | (2006.01) | |
| *G05B 15/02* | (2006.01) | |
| *G05B 19/418* | (2006.01) | |
| *B29C 33/38* | (2006.01) | |
| *B23Q 7/04* | (2006.01) | |
| *G05B 19/406* | (2006.01) | |
| *G05B 19/4065* | (2006.01) | |
| *B21D 53/50* | (2006.01) | |
| *B29D 5/00* | (2006.01) | |
| *B29D 5/02* | (2006.01) | |
| *B23D 35/00* | (2006.01) | |

(52) U.S. Cl.
CPC .......... *B23Q 7/046* (2013.01); *B29C 33/3842* (2013.01); *B29C 71/0009* (2013.01); *B29D 5/00* (2013.01); *B29D 5/02* (2013.01); *B65G 47/90* (2013.01); *B65G 47/905* (2013.01); *G05B 15/02* (2013.01); *G05B 19/406* (2013.01); *G05B 19/4065* (2013.01); *G05B 19/418* (2013.01); *G05B 19/4183* (2013.01); *G05B 19/4189* (2013.01); *G05B 19/41805* (2013.01); *G05B 19/41815* (2013.01); *G05B 19/41825* (2013.01); *G05B 19/41865* (2013.01); *B23D 35/008* (2013.01); *B23Q 2003/155414* (2016.11); *B29C 2071/0045* (2013.01); *G05B 2219/31023* (2013.01); *G05B 2219/31266* (2013.01); *G05B 2219/31268* (2013.01); *G05B 2219/31269* (2013.01); *G05B 2219/32054* (2013.01); *G05B 2219/32086* (2013.01); *G05B 2219/32088* (2013.01); *G05B 2219/32132* (2013.01); *G05B 2219/32135* (2013.01); *G05B 2219/49302* (2013.01)

(58) Field of Classification Search
USPC .......................................................... 234/128
See application file for complete search history.

(56) References Cited

U.S. PATENT DOCUMENTS

| | | | |
|---|---|---|---|
| 6,013,017 A * | 1/2000 | Aizawa .............. | B23Q 3/15513 83/563 |
| 6,615,852 B1 * | 9/2003 | Kitahara .................. | B08B 3/12 134/76 |
| 2006/0231983 A1 * | 10/2006 | Kondo ..................... | B44C 1/10 264/510 |
| 2010/0204824 A1 | 8/2010 | Luce et al. | |
| 2016/0167187 A1 * | 6/2016 | Burkhardt ................ | B23C 1/04 409/172 |
| 2020/0230761 A1 * | 7/2020 | Shirone ................ | B23Q 7/1436 |

FOREIGN PATENT DOCUMENTS

| | | |
|---|---|---|
| CN | 105929793 A | 9/2016 |
| CN | 107553136 A | 1/2018 |
| CN | 207451072 U | 6/2018 |
| JP | 60213454 A | 10/1985 |
| JP | 62195422 U | 12/1987 |
| JP | 2518664 B2 | 7/1996 |
| JP | 8300065 A | 11/1996 |
| JP | 3002250 B2 | 1/2000 |
| JP | 2002304208 A | 10/2002 |
| JP | 2003170319 A | 6/2003 |
| JP | 200574446 A | 3/2005 |
| JP | 2007118111 A | 5/2007 |
| JP | 200950978 A | 3/2009 |
| JP | 201363461 A | 4/2013 |
| JP | 3226880 U | 7/2020 |
| KR | 1020050096050 A | 10/2005 |
| TW | M531603 U | 11/2016 |
| TW | M596394 U | 6/2020 |
| WO | WO2019009337 A1 | 1/2019 |

* cited by examiner

DISPATCH SYSTEM AND DISPATCH METHOD FOR MANUFACTURING MOLD

CROSS-REFERENCE TO RELATED PATENT APPLICATION

This application claims the benefit of priority to Taiwan Patent Application No. 108130636, filed on Aug. 27, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a dispatch system and a dispatch method, and more particularly to a dispatch system and a dispatch method for manufacturing mold.

BACKGROUND OF THE DISCLOSURE

Since the First Industrial Revolution of the 18th century, a large quantity of machines and factories has replaced humans and animals for manufacturing products.

In a modern industrial production process, although machines and factories have replaced humans and animals as primary sources for productivity, manpower is still used for transporting materials and molds. As a result, efficiency of the production process cannot be optimized, and labor costs cannot be reduced.

SUMMARY OF THE DISCLOSURE

In response to the above-referenced technical inadequacies, the present disclosure provides a dispatch system and dispatch method for manufacturing mold.

In one aspect, the present disclosure provides a dispatch system for manufacturing mold, which includes a control unit, a mold material storage unit, a processing cutter storage unit, an object pick-and-place and transfer unit, a mold processing unit and a mold product storage unit. The mold material storage unit is electrically connected to the control unit and includes a plurality of unprocessed mold materials. The processing cutter storage unit is electrically connected to the control unit and includes a plurality of processing cutters. The object pick-and-place and transfer unit is electrically connected to the control unit and disposed between the mold material storage unit and the processing cutter storage unit, and the object pick-and-place and transfer unit includes a first clamping jaw. The mold processing unit is electrically connected to the control unit, wherein one of the unprocessed mold materials and at least one of the processing cutters are transferred to the mold processing unit by the object pick-and-place and transfer unit, and the unprocessed mold material is processed to form a mold product by the mold processing unit. The mold product storage unit is electrically connected to the control unit, and the mold product is transferred to the mold product storage unit.

In another aspect, the present disclosure provides a dispatch method for manufacturing mold, which includes providing a mold material storage unit and a processing cutter storage unit, the mold material storage unit and the processing cutter storage unit both being electrically connected to a control unit, the mold material storage unit including a plurality of unprocessed mold materials, and the processing cutter storage unit including a plurality of processing cutters; wherein one of the unprocessed mold materials is transferred to a mold processing unit by an object pick-and-place and transfer unit, and the object pick-and-place and transfer unit and the mold processing unit are both electrically connected to the control unit; processing the unprocessed mold material to form a mold product by the mold processing unit; and transferring the mold product to a mold product storage unit, and the mold product storage unit is electrically connected to the control unit.

Therefore, one of the beneficial effects of the present disclosure is that the dispatch system for manufacturing mold of the present disclosure can improve the mold-processing efficiency by the technical features of "a mold material storage unit being electrically connected to the control unit and including a plurality of unprocessed mold materials", "a processing cutter storage unit being electrically connected to the control unit and including a plurality of processing cutters", "an object pick-and-place and transfer unit being electrically connected to the control unit and disposed between the mold material storage unit and the processing cutter storage unit, and the object pick-and-place and transfer unit including a first clamping jaw", "a mold processing unit being electrically connected to the control unit, wherein one of the unprocessed mold materials and at least one of the processing cutters are transferred to the mold processing unit by the object pick-and-place and transfer unit, and the unprocessed mold material is processed to form a mold product by the mold processing unit", and "a mold product storage unit being electrically connected to the control unit and being transferred to the mold product storage unit".

Another of the beneficial effects of the present disclosure is that the dispatch method for manufacturing mold of the present disclosure can improve the mold-processing efficiency by the technical features of "providing a mold material storage unit and a processing cutter storage unit, the mold material storage unit and the processing cutter storage unit both being electrically connected to a control unit, the mold material storage unit including a plurality of unprocessed mold materials, and the processing cutter storage unit including a plurality of processing cutters", "transferring one of the unprocessed mold materials to a mold processing unit by an object pick-and-place and transfer unit, the object pick-and-place and transfer unit and the mold processing unit both being electrically connected to the control unit", "processing the unprocessed mold material to form a mold product by the mold processing unit", and "transferring the mold product to a mold product storage unit, the mold product storage unit being electrically connected to the control unit".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
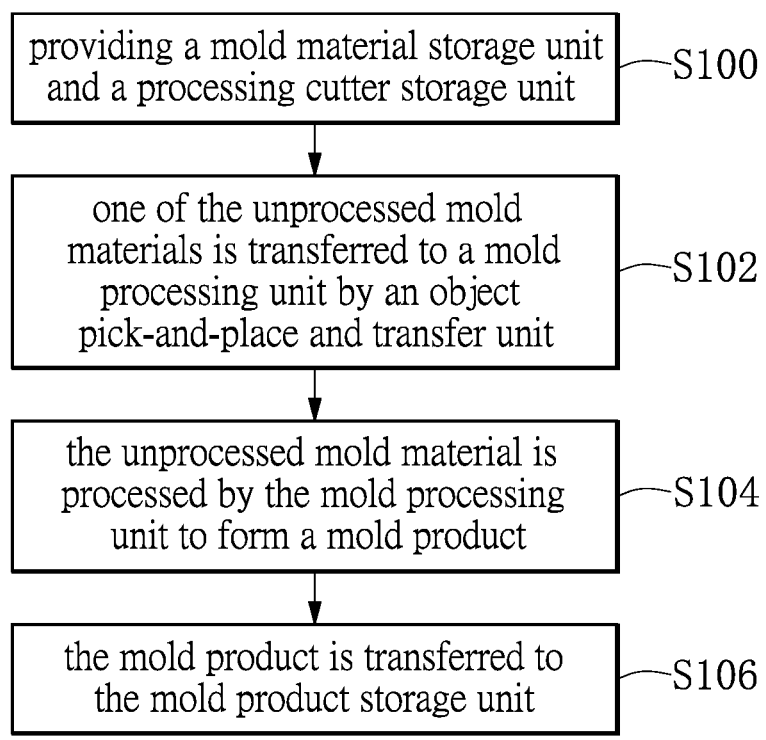
FIG. 1 is a flowchart of a dispatch method for manufacturing mold according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
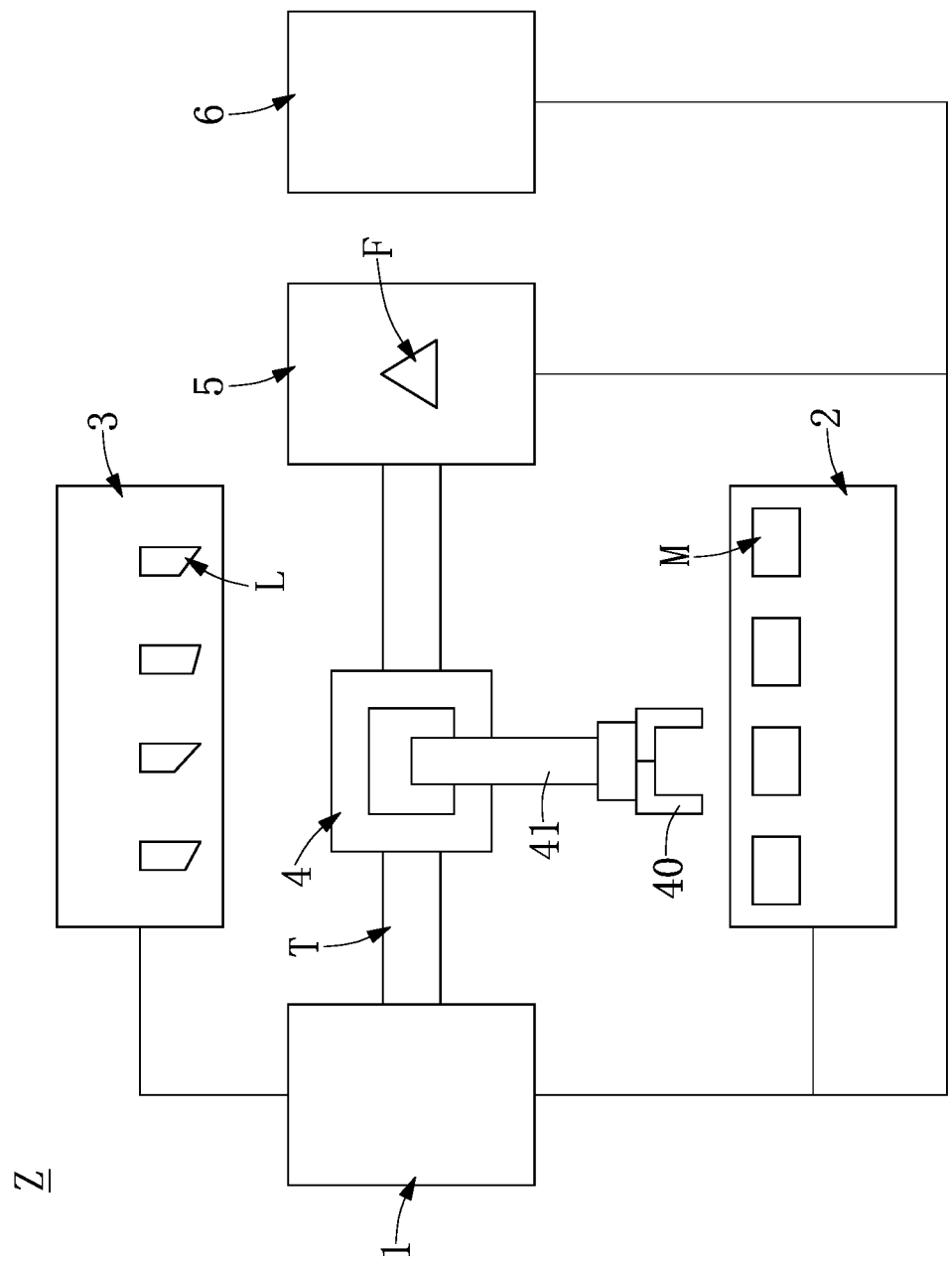
FIG. 2 is a schematic view of a dispatch system for manufacturing mold showing an arrangement thereof according to the first embodiment of the present disclosure.
Figure 3:
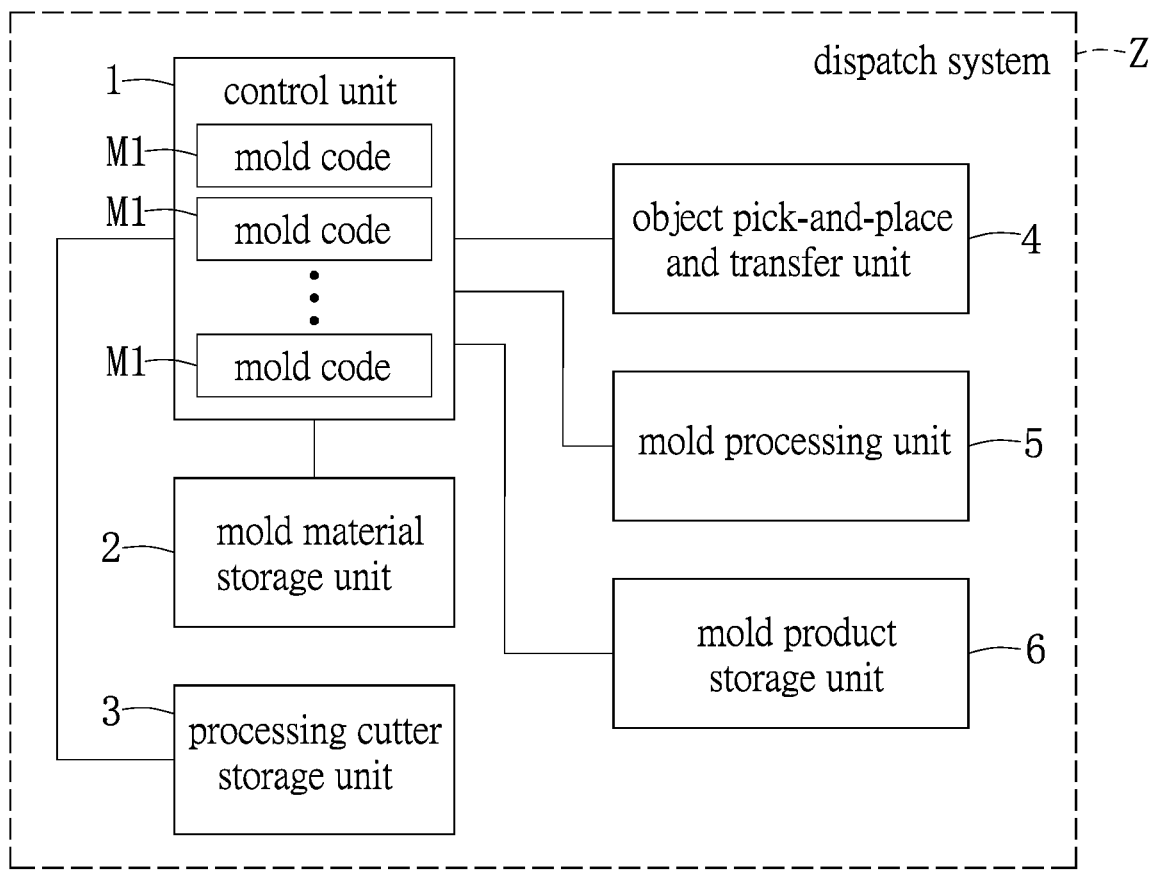
FIG. 3 is a functional block diagram of a dispatch system for manufacturing mold according to the first embodiment of the present disclosure.

Referring to FIG. 1 to FIG. 8, a first embodiment of the present disclosure provides a dispatch method for manufacturing mold, including the following steps:

Firstly, providing a mold material storage unit 2 and a processing cutter storage unit 3 (Step S100). For example, as shown in FIG. 1 to FIG. 3, the mold material storage unit 2 includes a plurality of unprocessed mold materials M, and the mold material storage unit 2 can be a material storage, and the mold materials M can be electrode materials, but is not limited thereto. The processing cutter storage unit 3 includes a plurality of processing cutters L, and the processing cutter storage unit 3 can be a cutter storage, and the processing cutter L can be a general mold-processing cutter, but is not limited thereto. In addition, the mold material storage unit 2 and the processing cutter storage unit 3 are both electrically connected to or wirelessly communicated with a control unit 1, the control unit 1 can be a control device, but is not limited thereto. Therefore, the control unit 1 can monitor whether or not the operation or usage of the mold material storage unit 2 is normal, and whether or not the operation or usage of the processing cutter storage unit 3 is normal in real time.

Figure 4:
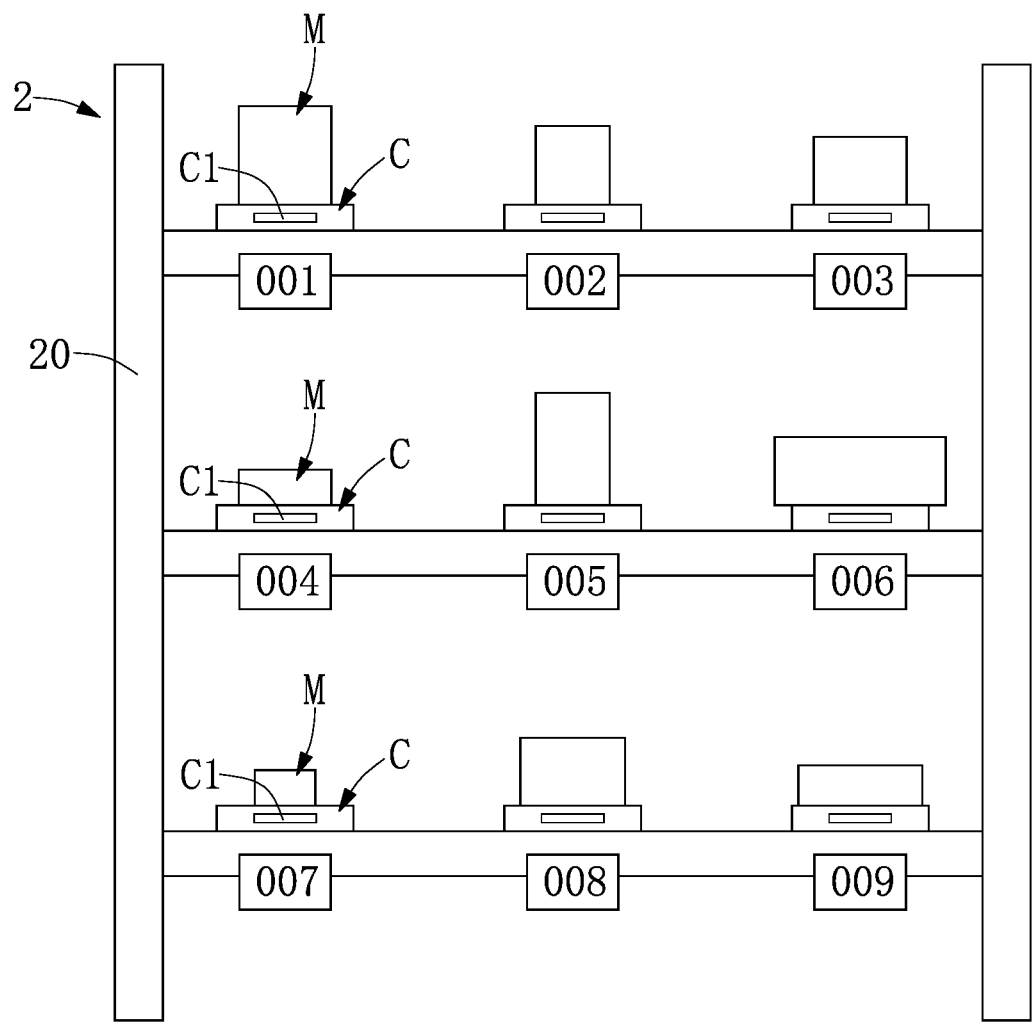
FIG. 4 is a structural schematic view of a mold material storage unit according to the first embodiment of the present disclosure.

Further, referring to FIG. 2 to FIG. 4, each unprocessed mold material M can be carried by a carrier C, the carrier C can be a carrier base. Each unprocessed mold material M is predefined with a mold code M1 (which can be text, number or other forms of encoding). Each carrier C has a mold number C1 corresponding to the mold code M1 (mold number C1 can also be a QR code in text, numbers or other encoded form, but is not limited thereto), so that the control unit 1 can recognize a model number of the unprocessed mold material M that is carried by the carrier C through scanning. The unprocessed mold materials M can be disposed on the mold material storage frame 20; in other words, the mold material storage frame 20 can store a plurality of carriers C, and each of the carriers C can carry the unprocessed mold material M. As shown in FIG. 4, the mold material storage unit 2 can include a mold material storage frame 20, which can be a general storage frame, but is not limited thereto. Moreover, an image-capturing device, such as but not limited to a camera (not shown in figures) can be set up on the mold material storage frame 20 of the mold material storage unit 2, the control unit 1 can electrically connect and control the image-capturing device so as to capture the mold number C1 on one of the carriers C to recognize a model number of the unprocessed mold material M that is carried by the carrier C through the image-capturing device. In addition, the control unit 1 can also determine whether or not a position or model number of the unprocessed mold material M is correct.

Figure 5:
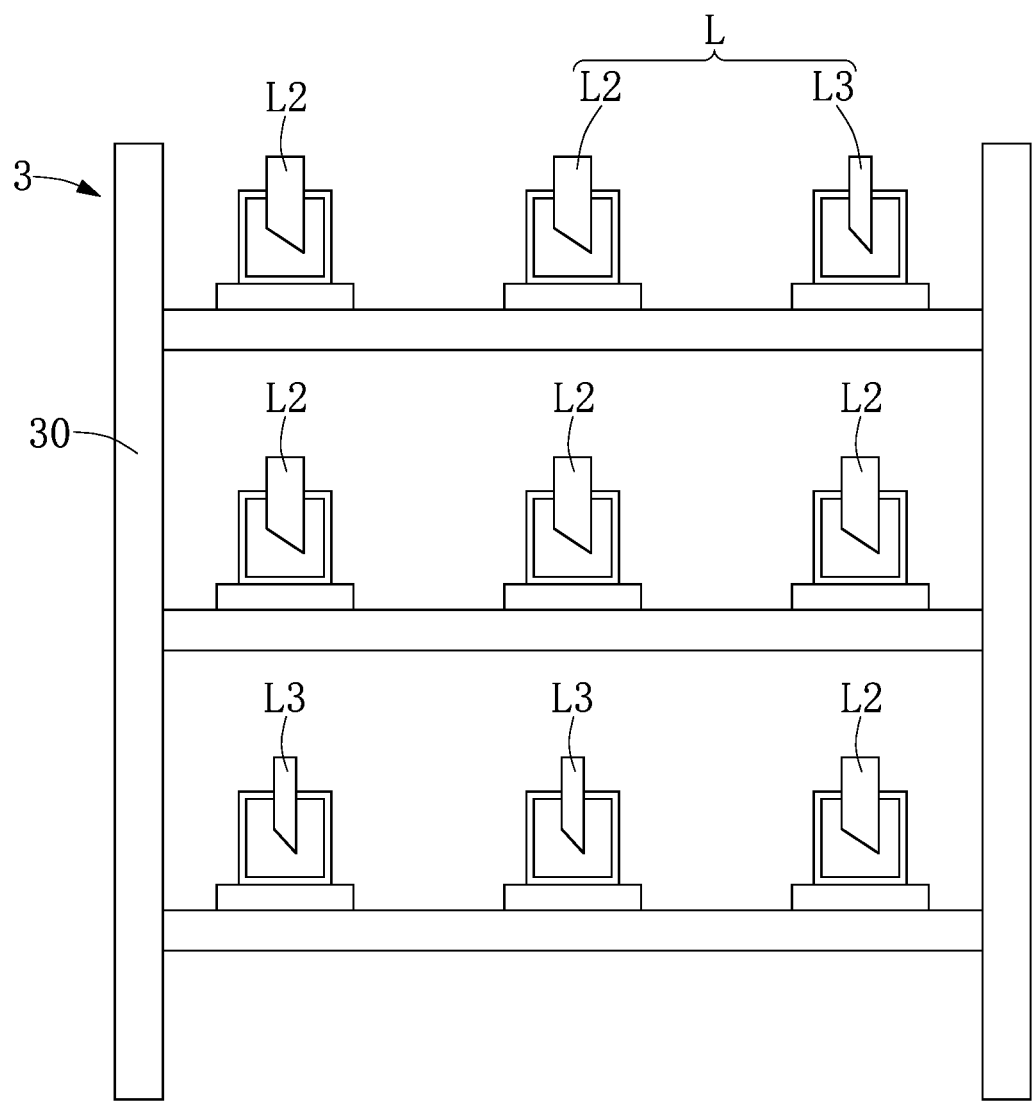
FIG. 5 is a structural schematic view of a processing cutter storage unit according to the first embodiment of the present disclosure.
Figure 6:
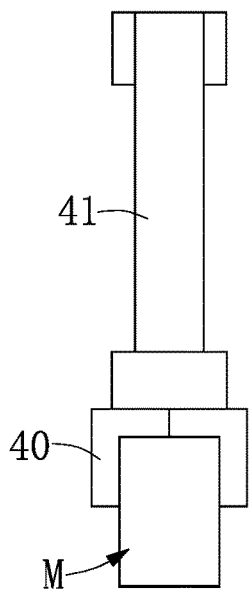
FIG. 6 is the first partial schematic view of an object pick-and-place and transfer unit according to the first embodiment of the present disclosure.
Figure 7:
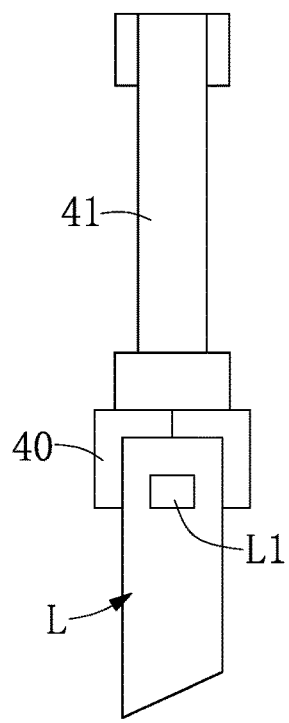
FIG. 7 is the second partial schematic view of an object pick-and-place and transfer unit according to the first embodiment of the present disclosure.

Furthermore, referring to FIG. 2 and FIG. 5, each processing cutter L has a cutter number L1 (which can be text, number or other forms of encoding, but is not limited thereto), so that the control unit 1 can recognize a model number of the processing cutter L through scanning. Furthermore, the processing cutter storage unit 3 also includes a processing cutter storage frame 30, which can be a general storage frame, but is not limited thereto. The processing cutters L are disposed on the processing cutter storage frame 30; for example, each processing cutter L is disposed on the processing cutter storage frame 30 by a clamping base (not shown in figures). Moreover, an image-capturing device can be set up on the processing cutter storage frame 30 of the processing cutter storage unit 3 (not shown in figures, e.g., a camera, but is not limited thereto), the control unit 1 can electrically connect and control the image-capturing device so as to capture the cutter number L1 on one of the processing cutter L to recognize a model number of the processing cutter L through the image-capturing device. In addition, the control unit 1 can also determine whether or not a position or model number of the processing cutter L is correct.

Next, one of the unprocessed mold materials M is transferred to a mold processing unit 5 by an object pick-and-place and transfer unit 4 (Step S102). For example, referring to FIG. 1, FIG. 2, FIG. 6 and FIG. 7, one of the unprocessed mold materials M on the mold material storage unit 2 is picked out and transferred to the mold processing unit 5 by the first clamping jaw 40 of the object pick-and-place and transfer unit 4 in the present disclosure. The object pick-and-place and transfer unit 4 and the mold processing unit 5 are both electrically connected to or wirelessly communicated with the control unit 1. The object pick-and-place and transfer unit 4 can be a movable manipulator, and the mold processing unit 5 can be a general mold-processing equipment, but is not limited thereto. In addition, the control unit 1 can monitor whether or not operation or usage of the object pick-and-place and transfer unit 4 is normal, and whether or not operation or usage of the mold processing unit 5 is normal in real time. In the case that the mold processing unit 5 is occupied by the processing cutter L, after the unprocessed mold materials M have been transferred to the mold processing unit 5 by the first clamping jaw 40 of the object pick-and-place and transfer unit 4, the processing can be conducted; when the mold processing unit 5 needs to have the processing cutter L replaced or needs to have the processing cutter L installed, the processing cutter L can be selectively replaced or installed by the control of the control unit 1 firstly, and then the unprocessed mold materials M can be transferred to a mold processing unit 5. Or, the unprocessed mold materials M are transferred to the mold processing unit 5 firstly, and then the processing cutter L is replaced or installed.

Figure 8:
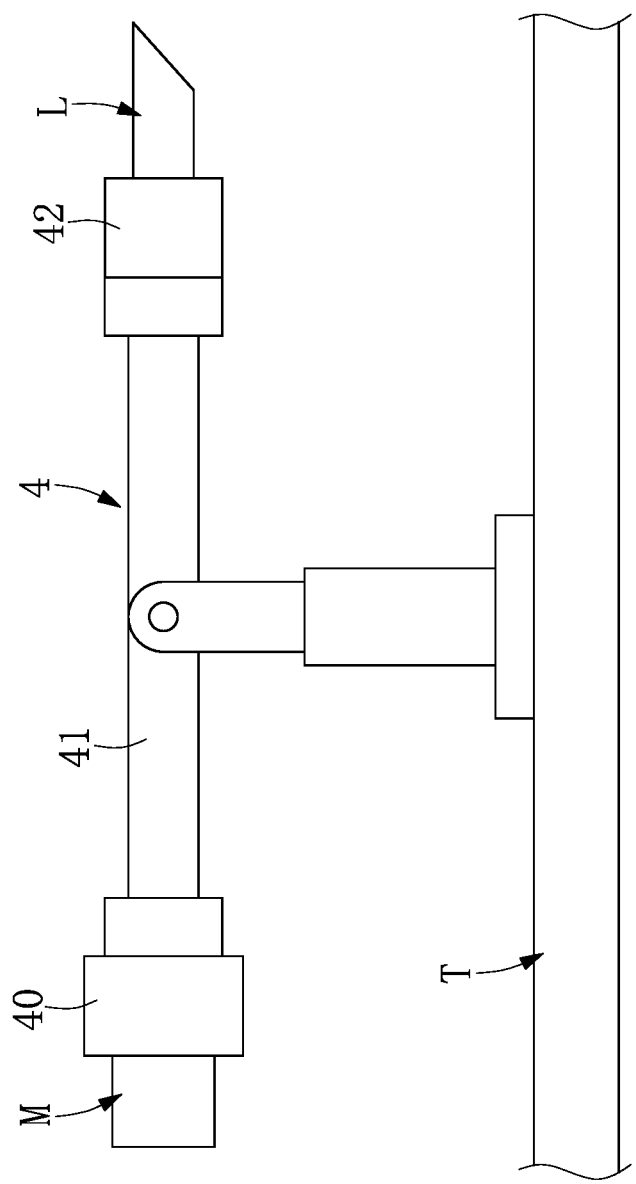
FIG. 8 is a structural schematic view of an object pick-and-place and transfer unit according to the first embodiment of the present disclosure.

Further, referring to FIG. 2 and FIG. 8, a track T can be set up between the mold material storage unit 2, the processing cutter storage unit 3 and the mold processing unit 5 for the object pick-and-place and transfer unit 4 to move between the mold material storage unit 2, the processing cutter storage unit 3 and the mold processing unit 5. In addition, the object pick-and-place and transfer unit 4 can further include a manipulator 41 and a second clamping jaw 42. In this embodiment, as an example but not limited thereto, two ends of the manipulator 41 are respectively connected to the first clamping jaw 40 and the second clamping jaw 42. In practice, two manipulators 41 can be respectively connected to the first clamping jaw 40 and the second clamping jaw 42. Further, the first clamping jaw 40 and the second clamping jaw 42 are respectively and horizontally disposed on opposite side ends of the manipulator 41 at 180°. In addition, the processing cutters L on the processing cutter storage frame 30 are divided into a plurality of usable processing cutters L2 and a plurality of worn processing cutters L3. Therefore, the object pick-and-place and transfer unit 4 can clamp one of the usable processing cutters L2 by the first clamping jaw 40. Next, when the usable processing cutters L2 are transferred to the mold processing unit 5, whether or not the worn processing cutters L3 on the mold processing unit 5 are clamped by the second clamping jaw 42 depends upon whether the worn processing cutters L3 need to be replaced, and the usable processing cutters L2 are installed on the mold processing unit 5. If the worn processing cutter L3 is removed, it can be transferred to the processing cutter storage unit 3 by the object pick-and-place and transfer unit 4, and the worn processing cutter L3 is placed on the processing cutter storage frame 30.

Moreover, the object pick-and-place and transfer unit 4 can also clamp one of the usable processing cutters L2 by the first clamping jaw 40 and clamp one of the unprocessed mold materials M by the second clamping jaw 42; next, after the usable processing cutters L2 and the unprocessed mold material M have been transferred to the mold processing unit 5 at the same time, the mold material M is placed and the usable processing cutter L2 is installed, and the processing can then be conducted.

Moreover, an image-capturing device, such as but not limited to a camera (not shown in figures), can be set up on the object pick-and-place and transfer unit 4 and the mold processing unit 5, the control unit 1 can be electrically connected to and control the image-capturing device so as to respectively capture the images of operation or usage of the object pick-and-place and transfer unit 4 and the mold processing unit 5 from a plurality of image-capturing devices.

Next, the unprocessed mold material M is processed by the mold processing unit 5 to form a mold product F (Step S104). For example, referring to FIG. 1 and FIG. 2, after the unprocessed mold material M has been transferred to the mold processing unit 5 by the object pick-and-place and transfer unit 4, the unprocessed mold material M is processed by the mold processing unit 5 to form the mold product F; wherein the mold product F can be a zipper puller, but is not limited thereto. Moreover, an image-capturing device, such as but not limited to a camera (not shown in figures), can be set up on the mold product storage unit 6. The control unit 1 can be electrically connected to and control the image-capturing device so as to capture the images of quantity and position of the mold product F set up on the mold product storage unit 6 for recognizing whether or not the position or the model number of the unprocessed mold material M is correct.

Next, the mold product F is transferred to the mold product storage unit 6 (Step S106). For example, referring to FIG. 1 and FIG. 2, the mold product storage unit 6 electrically connects to or communicates with the control unit 1. The mold product storage unit 6 can be a storage table or a storage frame, but is not limited thereto; and, the control unit 1 can monitor whether or not the operation or usage of the mold product storage unit 6 is normal in real time. After the unprocessed mold material M has been formed to be the mold product F by processing, it can be transferred to store in the mold product storage unit 6 by mechanical transportation or manual transportation. Moreover, an image-capturing device, such as but not limited to a camera (not shown in figures), can be set up on the mold product storage unit 6. The control unit 1 can electrically connect and control the image-capturing device so as to capture the images of quantity and position of the mold product F set up on the mold product storage unit 6 for recognizing whether or not the position or the model number of the mold product F is correct.

According to the above content, the present disclosure further provides a dispatch system Z for manufacturing mold, which includes a control unit 1, a mold material storage unit 2, a processing cutter storage unit 3, an object pick-and-place and transfer unit 4, a mold processing unit 5 and a mold product storage unit 6. The mold material storage unit 2 is electrically connected to the control unit 1, and the mold material storage unit 2 includes a plurality of unprocessed mold materials M. The processing cutter storage unit 3 is electrically connected to the control unit 1, and the processing cutter storage unit 3 includes a plurality of processing cutters L. The object pick-and-place and transfer unit 4 is electrically connected to the control unit 1 and disposed between the mold material storage unit 2 and the processing cutter storage unit 3, and the object pick-and-place and transfer unit 4 includes a first clamping jaw 40. The mold processing unit 5 is electrically connected to the control unit 1, wherein one of the unprocessed mold materials M and at least one of the processing cutters L are transferred to the mold processing unit 5 by the object pick-and-place and transfer unit 4, and the unprocessed mold material M is processed to form a mold product F by the mold processing unit 5. The mold product storage unit 6 is electrically connected to the control unit 1, and the mold product F is transferred to the mold product storage unit 6.

Accordingly, the dispatch system Z and dispatch method for manufacturing mold of the present disclosure can replace the traditional processing method of "manufacturing molds manually with a single working machine" through the technical features associated with "the mold material storage unit 2", "the processing cutter storage unit 3", and "the object pick-and-place and transfer unit 4". The present disclosure can not only save labor costs and time during mold processing, but also provide optimal processing parameters for mold processing by intellectualization (e.g., in the selection of the processing cutters).

The embodiments were chosen and described in order to explain the principles of the disclosure and their practical application, but the present disclosure is not limited thereto.

Second Embodiment

Figure 9:
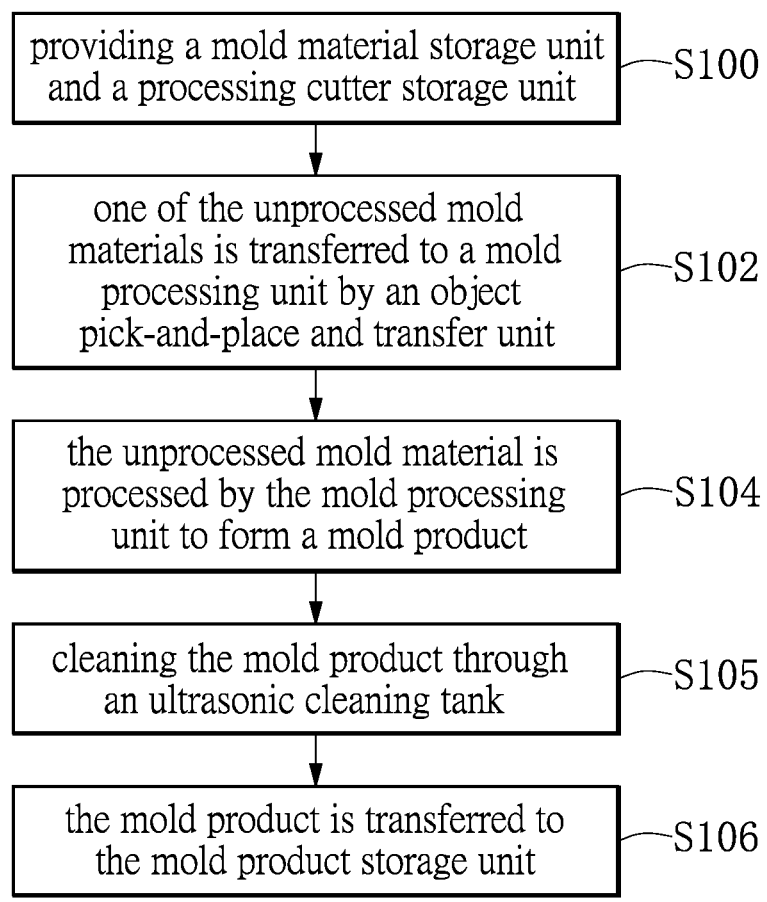
FIG. 9 is a flowchart of a dispatch method for manufacturing mold according to a second embodiment of the present disclosure.
Figure 10:
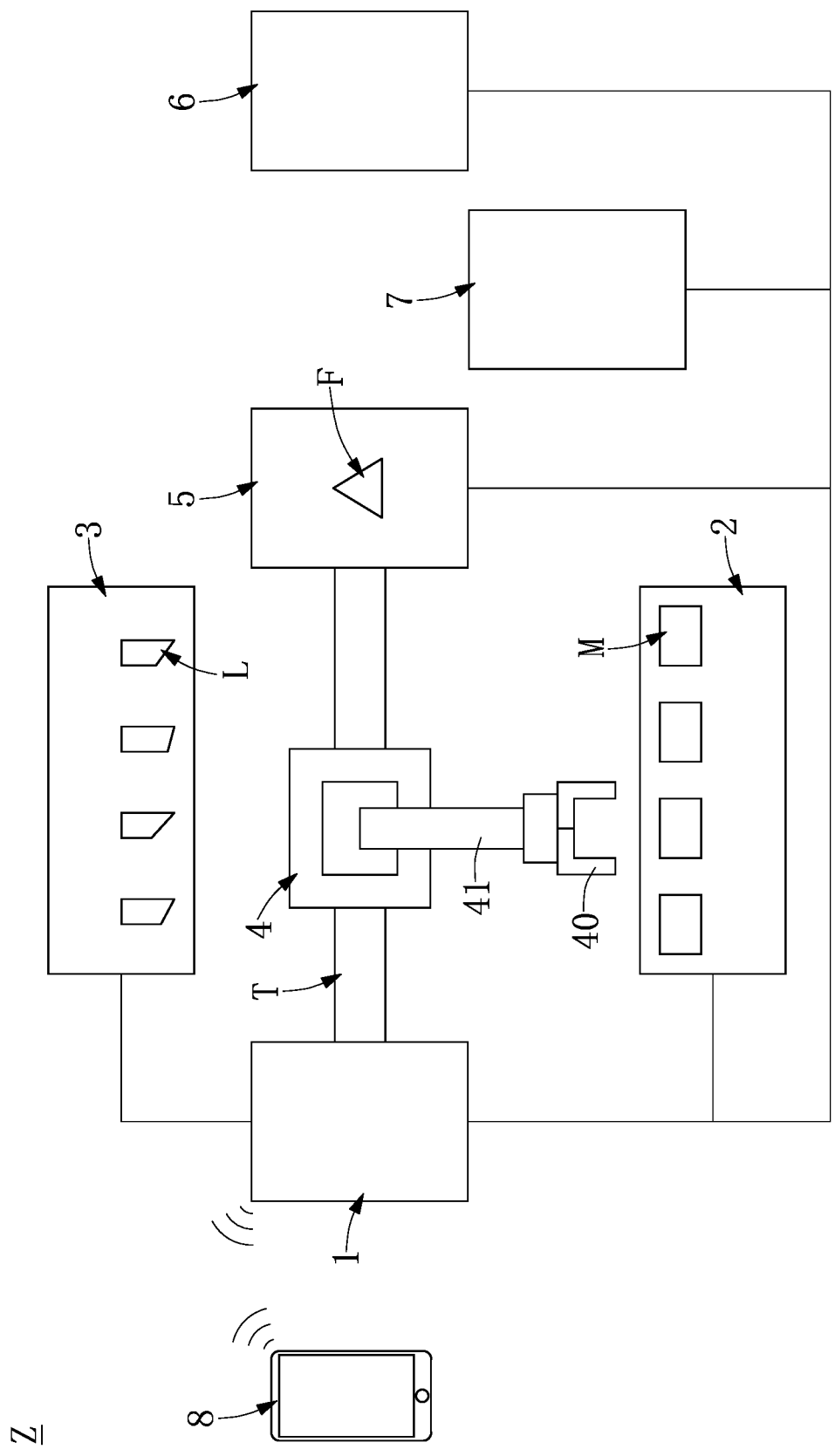
FIG. 10 is a schematic view of a dispatch system for manufacturing mold showing an arrangement thereof according to the second embodiment of the present disclosure.

Referring to FIG. 9 and FIG. 10, a second embodiment of the present disclosure provides a dispatch method for manufacturing mold further including: cleaning the mold product F through an ultrasonic cleaning tank 7 (Step S105). For example, as shown in FIG. 9 and FIG. 10, the dispatch system Z for manufacturing mold of the present disclosure can further include an ultrasonic cleaning tank 7, which is electrically connected to the control unit 1, and the control unit 1 can monitor whether or not the operation or usage of the ultrasonic cleaning tank 7 is normal in real time. The ultrasonic cleaning tank 7 can be disposed between the mold processing unit 5 and the mold product storage unit 6. Therefore, after the mold processing unit 5 produces the mold product F, the mold product F can be transferred to the ultrasonic cleaning tank 7 for cleaning by mechanical transportation or manual transportation. Moreover, an image-capturing device, such as but not limited to a camera, can be set up on the ultrasonic cleaning tank 7, the control unit 1 can be electrically connected to and control the image-capturing device so as to capture the images of the operation or usage situation of the ultrasonic cleaning tank 7 from the image-capturing device.

Further, referring to FIG. 9 and FIG. 10, the dispatch system Z for manufacturing mold of the present disclosure also includes a handheld device 8, which can be an electronic communication device such as a mobile phone or tablet, but is not limited thereto. The handheld device 8 can be communicated with the control unit 1 to receive a relevant real-time information from the dispatch system Z for manufacturing mold. The relevant real-time information includes whether or not the operation or usage of the mold material storage unit 2 is normal, whether or not the operation or usage of the processing cutter storage unit 3 is normal, whether or not the operation or usage of the object pick-and-place and transfer unit 4 is normal, whether or not the operation or usage of the mold processing unit 5 is normal, whether or not the operation or usage of the mold product storage unit 6 is normal, whether or not the operation or usage of the ultrasonic cleaning tank 7 is normal, whether or not the position or model number of the unprocessed mold material M is correct, whether or not the position or model number of the processing cutter L is correct, and whether or not the position or model number of the mold product F is correct.

The embodiments were chosen and described in order to explain the principles of the disclosure and their practical application, but the present disclosure is not limited thereto.

One of the beneficial effects of the present disclosure is that the dispatch system for manufacturing mold of the present disclosure can improve the mold-processing efficiency by the technical features of "a mold material storage unit 2 being electrically connected to the control unit 1 and including a plurality of unprocessed mold materials M", "a processing cutter storage unit 3 being electrically connected to the control unit 1 and including a plurality of processing cutters L", "an object pick-and-place and transfer unit 4 being electrically connected to the control unit 1 and disposed between the mold material storage unit 2 and the processing cutter storage unit 3, and the object pick-and-place and transfer unit 4 including a first clamping jaw 40", "a mold processing unit 5 being electrically connected to the control unit 1, wherein one of the unprocessed mold materials M and at least one of the processing cutters L are transferred to the mold processing unit 5 by the object pick-and-place and transfer unit 4, and the unprocessed mold material M is processed to form a mold product F by the mold processing unit 5", and "a mold product storage unit 6 being electrically connected to the control unit 1, and the mold product F being transferred to the mold product storage unit 6".

Another of the beneficial effects of the present disclosure is that the dispatch method for manufacturing mold of the present disclosure can improve the mold-processing efficiency by the technical features of "providing a mold material storage unit and a processing cutter storage unit, the mold material storage unit and the processing cutter storage unit both being electrically connected to a control unit, the mold material storage unit including a plurality of unprocessed mold materials, and the processing cutter storage unit including a plurality of processing cutters", "transferring one of the unprocessed mold materials to a mold processing unit by an object pick-and-place and transfer unit, the object pick-and-place and transfer unit and the mold processing unit both being electrically connected to the control unit", "processing the unprocessed mold material to form a mold product by the mold processing unit", and "transferring the mold product to a mold product storage unit, the mold product storage unit being electrically connected to the control unit".

Further, the dispatch system Z and dispatch method for manufacturing mold of the present disclosure can replace the traditional processing method of "manufacturing molds manually with a single working machine" through the technical features associated with "the mold material storage unit 2", "the processing cutter storage unit 3", and "the object pick-and-place and transfer unit 4". The present disclosure can not only save labor costs and time during mold processing, but also provide optimal processing parameters for mold processing by intellectualization (e.g., in the selection of the processing cutters). Additionally, the present disclosure can efficiently collect relevant processing information as evaluation data for subsequent improvements.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dispatch system for manufacturing mold, comprising:
   a control unit;
   a mold material storage unit electrically connected to the control unit and including a plurality of unprocessed mold materials;
   a processing cutter storage unit electrically connected to the control unit and including a plurality of processing cutters;
   an object pick-and-place and transfer unit electrically connected to the control unit and disposed between the mold material storage unit and the processing cutter storage unit, and the object pick-and-place and transfer unit including a first clamping jaw;
   a mold processing unit electrically connected to the control unit, wherein one of the unprocessed mold materials and at least one of the processing cutters are transferred to the mold processing unit by the object pick-and-place and transfer unit, and the unprocessed mold material is processed to form a mold product by the mold processing unit;
   a mold product storage unit electrically connected to the control unit, and the mold product being transferred to the mold product storage unit; and
   an ultrasonic cleaning tank electrically connected to the control unit and disposed between the mold processing unit and the mold product storage unit, and the mold product being cleaned through the ultrasonic cleaning tank.

2. The dispatch system according to claim 1, wherein each unprocessed mold material is carried by a carrier, each unprocessed mold material is predefined with a mold code, each carrier has a mold number corresponding to the mold code so that the control unit is able to recognize a model number of the unprocessed mold material that is carried by the carrier through scanning the mold number; wherein the mold material storage unit includes a mold material storage frame, and the unprocessed mold materials are disposed on the mold material storage frame.

3. The dispatch system according to claim 1, wherein each processing cutter has a cutter number so that the control unit is able to recognize a model number of the processing cutter through scanning the cutter number; wherein the processing cutter storage unit includes a processing cutter storage frame, and the processing cutters are disposed on the processing cutter storage frame.

4. The dispatch system according to claim 1, wherein the object pick-and-place and transfer unit moves between the mold material storage unit, the processing cutter storage unit and the mold processing unit through a track, and the object pick-and-place and transfer unit further includes a manipulator and a second clamping jaw.

5. The dispatch system according to claim 4, wherein the first clamping jaw and the second clamping jaw are respectively disposed on opposite side ends of the manipulator with 180° level, the processing cutters are divided into usable processing cutters and worn processing cutters, the first clamping jaw clamps one of the usable processing cutters, and the second clamping jaw clamps one of the worn processing cutters.

6. The dispatch system according to claim 5, further comprising: a handheld device that is electrically connected to the control unit to receive a relevant real-time information from the dispatch system for manufacturing mold, and the relevant real-time information including whether or not operation or usage of the mold material storage unit is normal, whether or not operation or usage of the processing cutter storage unit is normal, whether or not operation or usage of the object pick-and-place and transfer unit is normal, whether or not operation or usage of the mold processing unit is normal, whether or not operation or usage of the mold product storage unit is normal, whether or not operation or usage of the ultrasonic cleaning tank is normal, whether or not position or model number of the unprocessed mold material is correct, whether or not position or model number of the processing cutter is correct, whether or not position or model number of the mold product is correct.

7. A dispatch method for manufacturing mold, comprising:
   providing a mold material storage unit and a processing cutter storage unit, the mold material storage unit and the processing cutter storage unit both being electrically connected to a control unit, the mold material storage unit including a plurality of unprocessed mold materials, and the processing cutter storage unit including a plurality of processing cutters;
   transferring one of the unprocessed mold materials to a mold processing unit by an object pick-and-place and transfer unit, and the object pick-and-place and transfer unit and the mold processing unit both electrically connected to the control unit;
   processing the unprocessed mold material to form a mold product by the mold processing unit;
   cleaning the mold product through an ultrasonic cleaning tank; and
   transferring the mold product to a mold product storage unit, and the mold product storage unit electrically connected to the control unit.

8. The dispatch method according to claim 7, wherein each unprocessed mold material is carried by a carrier, each unprocessed mold material is predefined with a mold code, each carrier has a mold number corresponding to the mold code so that the control unit is able to recognize a model number of the unprocessed mold material that is carried by the carrier through scanning the mold number; wherein the mold material storage unit includes a mold material storage frame, and the unprocessed mold materials are disposed on the mold material storage frame; wherein each processing cutter has a cutter number so that the control unit is able to recognize a model number of the processing cutter through scanning the cutter number; wherein the processing cutter storage unit includes a processing cutter storage frame, and the processing cutters are disposed on the processing cutter storage frame.

* * * * *